No. 121,548. Patented Dec. 5, 1871.

HADWEN L PURDIE.

Locking Washer for Nuts.

Witnesses
Wm H Seaman
John Purdie

Inventor.
Hadwen L. Purdie.
Daniel Breed
Atty.

121,548

UNITED STATES PATENT OFFICE.

HADWEN L. PURDIE, DECEASED, OF BUFFALO, NEW YORK, (JOHN PURDIE, ADMINISTRATOR.)

IMPROVEMENT IN NUT-LOCKING DEVICES.

Specification forming part of Letters Patent No. 121,548, dated December 5, 1871.

*To all whom it may concern:*

Be it known that I, HADWEN L. PURDIE, of Buffalo, in the county of Erie and State of New York, have invented certain Improvements in Locking-Washers, of which the following is a specification:

My invention consists of a washer provided with one or more dogs, so arranged as to enter a recess in the washer-plate when the nut is being turned home, and then swing out by gravity, and thus lock the nut. Any number of dogs may be used. The corners of the nut in sweeping round push the dog or dogs into the recesses of the washer, and the dog or dogs fall again by the side of the nut as soon as the corners of the nut have passed, thus preventing the rotation of the nut backward when in a suspended position. My invention or washer is intended to be used upon the lower end of bolts or for suspended nuts.

Figure 1:
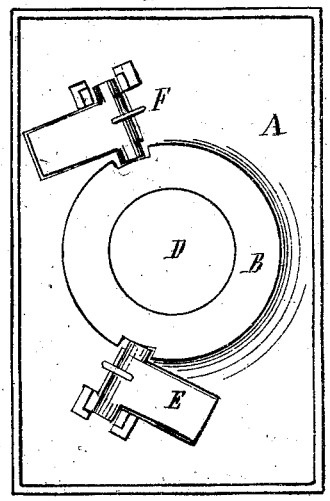
Figure 2:
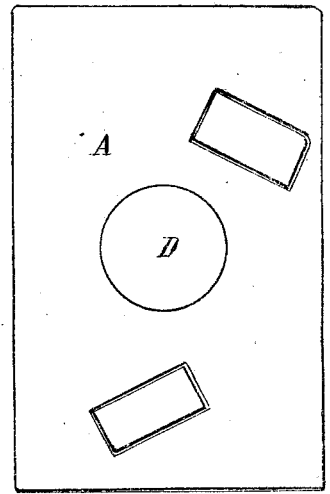
Figure 3:
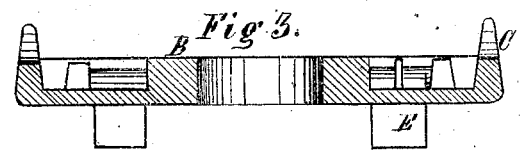

In the accompanying drawing, Figure 1 is a view of the hollow side of my improved washer. Fig. 2 is a view of the face side of the same; and Fig. 3 is a vertical longitudinal section of the same.

In the construction of my improved washer I propose to use malleable or cast-iron, yet any other suitable metal may be employed. The main plate of the washer A is cast with a hub, B, projecting on the hollow side of the washer, as shown in Fig. 3. The ends of the washer may have flanges C, intended to fit over the edges of the plate or timber against which the washer is placed. The bolt passes through the hole D, and the nut is put on below the washer, which is intended to be used in the position seen in Fig. 3. The pivoted dogs E are also cast so as to be inserted in place in the washer without any finishing. A small wire-stop, F, prevents the dog from falling out when the washer is removed and turned over. The pivot may also be held in place by closing the ears of the sockets.

My above-described washer may be made very cheaply, as it does not require any finishing whatever, the whole being cast ready for use, except the placing of the dogs in the bearings for the pivots and the slight bending of the wire-stop F, or closing down the ears of the socket by hammering or pressure. A spring may be employed to hold the dogs in place when used where the parts are liable to be shaken; but I do not, in this application, make claim to such spring. My locking-washer is also applicable to the heads of bolts.

Having thus fully described my invention, I claim—

The above-described pivoted dog or dogs, so arranged that, by the rotation of the nut forward, they are forced into the hollows or recesses until the nut is screwed home, when the dog or dogs fall or swing, by gravity, by the side of the square of the nut, thus preventing the rotation of the nut backward when in a suspended position.

HADWEN L. PURDIE.

Witnesses:
 DANIEL BREED,
 JOHN PURDIE.

(14)